United States Patent
Narula (10) Patent No.: US 10,397,371 B2
(45) Date of Patent: *Aug. 27, 2019

(54) SAVING AND RESTORING A STATE OF A WEB APPLICATION

(71) Applicant: International Business Machines Corporation, Armonk, NY (US)

(72) Inventor: Samit Narula, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 358 days.

This patent is subject to a terminal disclaimer.

(21) Appl. No.: 14/299,290

(22) Filed: Jun. 9, 2014

(65) Prior Publication Data

US 2015/0358413 A1 Dec. 10, 2015

(51) Int. Cl.
*G06F 11/07* (2006.01)
*G06F 13/14* (2006.01)
(Continued)

(52) U.S. Cl.
CPC .............. *H04L 67/42* (2013.01); *G06F 11/07* (2013.01); *G06F 13/14* (2013.01); *H04L 67/02* (2013.01);
(Continued)

(58) Field of Classification Search
CPC .......... G06F 11/07; G06F 13/00; G06F 13/14; H04L 67/34; H04L 67/14; H04L 67/142; H04L 67/28; H04L 67/00
See application file for complete search history.

(56) References Cited

U.S. PATENT DOCUMENTS 7,146,563 B2 * 12/2006 Hesmer ............... G06F 17/3089
707/E17.116
7,185,274 B1 * 2/2007 Rubin ................. G06F 17/2235
707/E17.013
(Continued)

FOREIGN PATENT DOCUMENTS

CA 2508317 C 8/2004
CA 2797451 A1 12/2011
(Continued)

OTHER PUBLICATIONS

SAP NetWeaver 04, "Portal Integration of Web Dynpro Applications," http://www.sdn.sap.com/irj/scn/go/portal/prtroot/docs/library/uuid/d35bb690-0201-0010-988a-d669c8530518?QuickLink=index&overridelayout=true&5003637808995, 2004, pp. 1-30.
(Continued)

*Primary Examiner* — Patrice L Winder
*Assistant Examiner* — Angela M Widhalm de Rodrig
(74) *Attorney, Agent, or Firm* — Brian J. Colandreo, Esq.; Jeffrey T. Placker, Esq.; Holland & Knight LLP (57) ABSTRACT

Embodiments of the present disclosure provide a system, method and computer program product for saving and restoring a state of a web application. According to one embodiment, the method comprises receiving an indication from at least one portlet of the web application for monitoring the state of the portlet, A type of storage mechanism supported by a client interface used for accessing the web application may be detected. An event indicating an input of a content in a form of a page of the portlet may be detected. The content received as input may be saved into a memory using the detected type of storage mechanism. The state of the page may be restored on reload using the content stored into the memory.

9 Claims, 4 Drawing Sheets (51) Int. Cl.
*H04L 29/06* (2006.01)
*H04L 29/08* (2006.01)

(52) U.S. Cl.
CPC ............ *H04L 67/142* (2013.01); *H04L 67/16* (2013.01); *H04L 67/289* (2013.01); *H04L 67/2842* (2013.01)

(56) References Cited

U.S. PATENT DOCUMENTS

| | | | |
|---|---|---|---|
| 7,254,542 B2 * | 8/2007 | Dames | G10L 15/26 704/270.1 |
| 7,647,564 B2 * | 1/2010 | Olander | G06F 3/0482 715/762 |
| 7,685,083 B2 * | 3/2010 | Fairweather | G06F 8/427 706/45 |
| 7,801,970 B2 * | 9/2010 | Behl | G06F 17/30873 709/203 |
| 8,176,411 B2 | 5/2012 | Palmieri | |
| 8,402,141 B2 | 3/2013 | Seraphin | |
| 8,527,636 B2 * | 9/2013 | Heymann | G06F 17/30873 709/227 |
| 8,527,640 B2 * | 9/2013 | Reisman | G06F 17/30873 709/227 |
| 8,645,820 B2 * | 2/2014 | Daga | G06F 17/243 715/244 |
| 8,996,715 B2 * | 3/2015 | Roy | H04L 63/0245 709/230 |
| 2005/0246288 A1 | 11/2005 | Kimura et al. | |
| 2011/0238586 A1 * | 9/2011 | Mainville | G06Q 30/02 705/313 |
| 2012/0227116 A1 | 9/2012 | Huang et al. | |
| 2012/0246648 A1 * | 9/2012 | DeLuca | G06F 1/3212 718/100 |
| 2014/0040580 A1 * | 2/2014 | Kripalani | G06F 3/065 711/162 |

FOREIGN PATENT DOCUMENTS

| | | |
|---|---|---|
| WO | 2004068367 A3 | 8/2004 |
| WO | 2011035944 A1 | 3/2011 |
| WO | 2011162874 A3 | 12/2011 |

OTHER PUBLICATIONS

Microsoft Corporation, "Design and Implementation Guidelines for Web Clients," http://msdn.microsoft.com/en-us/library/ff647327.aspx, Nov. 2003, pp. 1-27.

IBM List of Patents or Patent Applications to be Treated as Related (for Examiner Information only) dated May 29, 2015, pp. 1-2.

* cited by examiner

SAVING AND RESTORING A STATE OF A WEB APPLICATION

BACKGROUND

The present disclosure relates to information technology, and more specifically, to saving and restoring a state of a web application without modifying it as it is deployed.

A web application in general may be hosted on a server and a user may access the web application through a thin client interface on a client device. The web application may include html based forms and the user generally fills out the forms to provide the required content as input. In certain usage scenarios, a user may navigate away from a page displaying the form, in order to refer to some information that is required to be provided. For example, in aspects of the web application being a portal, navigation may include, a user navigating from one portal page to another, navigating from one portlet state to another on the same portal page, and navigating from one page of a portlet to another page of the portlet on the same portal page. For example, in case of a portal, more than one web page may be integrated into the same portal.

SUMMARY

According to embodiments of the present disclosure, there is provided a system, a computer program product and a method of saving and restoring a state of a web application, wherein the method includes receiving an indication from at least one portlet of the web application for monitoring the state of the portlet. The method may also include detecting a type of storage mechanism supported by a client interface used for accessing the web application. The method may also include detecting an event indicating an input of a content in a form of a page of the portlet. The method may also include saving the content received as input into a memory using the detected type of storage mechanism. The method may further include restoring the state of the page on reload using the content stored into the memory.

According to another embodiment, a computer program product for saving and restoring a state of a web application may include a computer readable storage medium having program code embodied therewith. The program code may be executable by a processor for receiving an indication from at least one portlet of the web application for monitoring the state of the portlet. Program code may also be included for detecting a type of storage mechanism supported by a client interface used for accessing the web application. Program code may also be included for detecting an event indicating an input of a content in a form of a page of the portlet. Program code may also be included for saving the content received as input into a memory using the detected type of storage mechanism. Program code may further be included for restoring the state of the page on reload using the content stored into the memory.

According to yet another embodiment, a system may include a memory having computer readable instructions, and a processor for executing the computer readable instruction. The instructions may include instructions for receiving an indication from at least one portlet of the web application for monitoring the state of the portlet. Instructions may be included for detecting a type of storage mechanism supported by a client interface used for accessing the web application. Instructions may also be included for detecting an event indicating an input of a content in a form of a page of the portlet. Instructions may also be included for saving the content received as input into the memory using the detected type of storage mechanism. Instructions may further be included for restoring the state of the page on reload using the content stored into the memory.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some example embodiments will be described in more detail with reference to the accompanying drawings, in which the example embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present disclosure may be embodied as a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
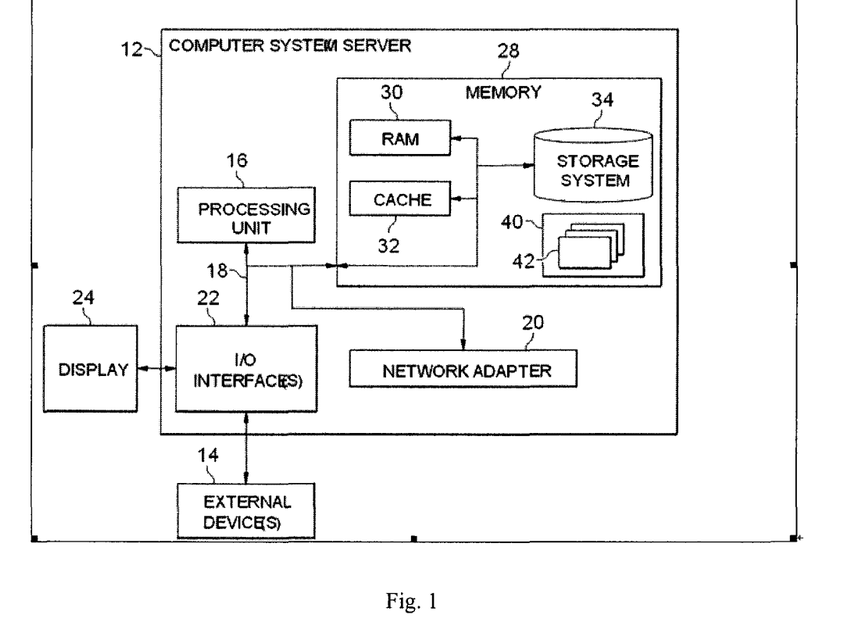
FIG. 1 shows an example computer system which is applicable to implement the embodiments of the present disclosure.

Referring now to FIG. 1, in which an example computer system/server 12 which is applicable to implement some embodiments of the present disclosure is shown. Computer system/server 12 is only illustrative and is not intended to suggest any limitation as to the scope of use or functionality of embodiments of the disclosure described herein. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
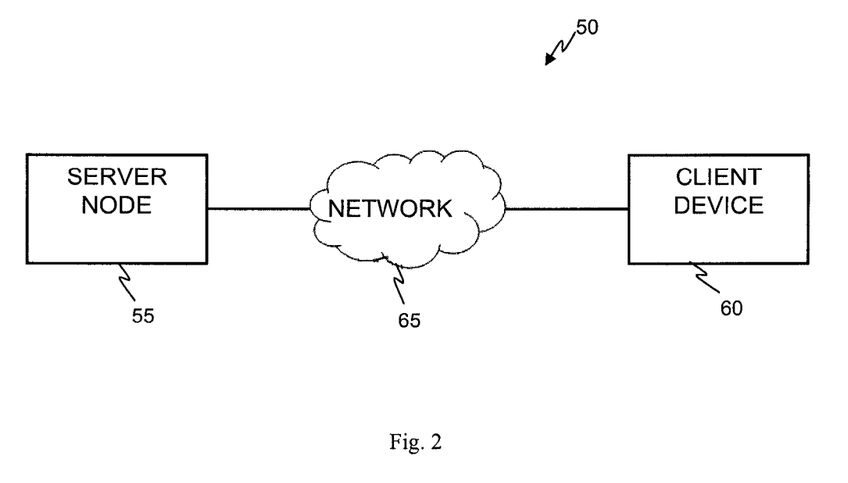
FIG. 2 shows an example system for saving and restoring a state of a web application in accordance with aspects of the present disclosure.

FIG. 2 depicts a system 50 for saving and restoring a state of a web application in accordance with aspects of the present disclosure. As shown in the example of FIG. 2, the system 50 may include a server node 55 and a client device 60 operatively connected by a network 65. In general, the client device 60 may include the computer system 12 of FIG. 1 operated by a user. The server node 80 may include the computer server 12 of FIG. 1. The network 65 may be a local area network (LAN), a general wide area network (WAN), and/or a public network (e.g., the Internet). The server node 55 may host one or more web applications and the user may access the web applications hosted at the server node 55 from the client device 60 through a thin client interface such as a web browser. According to one embodiment of the present disclosure, the one or more web applications may be a portal comprising one or more portlets. A portlet may include a specialized content area within a portal that occupies a small window in the portal. The portlet can process requests and generate dynamic content. In certain embodiments, a page may be embedded into the portlet using an iframe. A user can navigate through the embedded page.

According to one embodiment of the present disclosure, the portal is configured to save and restore a client state behavior. For example, a client state of the web application being accessed using the client device 60, not yet submitted to the server node 55, may be saved, so that the saved state may be retrieved later for restoring the state of the portlet. To achieve this, an application may be provided with the portal that is loaded on the client device when a user accesses the portal. The application may be notified of the portlets which should be monitored for saving the state. According to one embodiment of the present disclosure, a portlet for which the state is to be saved may be configured to provide an indication to indicate that the state of the portlet should be monitored. The application may be configured to receive this indication. Responsive to the indication, the page of the portlet may be configured to provide an identification information uniquely identifying the page of the portlet to the application. This may make the application aware as to the portlet and the page of the portlet which is to be monitored. According to one embodiment, the application may be configured to detect a storage mechanism supported by the thin client interface through which the web application may be accessed. Examples of storage mechanisms supported by thin client interfaces, may include, client-side cookie, internet explorer user data behavior, storage application programming interface (API), and the like. This may assist the application to use the storage mechanism supported by the thin client for saving the state of the page.

According to one embodiment of the present disclosure, the application may be configured to save the state of a page on detecting that content has been provided as an input by the user. For example, this may be achieved by detecting an event indicating the input of a content in a form of a page of the portlet or unload of the current portlet page content and the content inputted may be saved into a memory (e.g., the system memory 28 in FIG. 1 and/or the storage system 34 in FIG. 1) the client device 60 comprises. Saving the content inputted by the user may save the client state. In one embodiment, the event may be generated when the user navigates from a text input field in the form. For example, while filing out the form, the user may input the content in one text input field and then navigate to another text input field to input the content therein. Therefore, according to one embodiment, the event may be generated when the user navigates from one text input field to another.

According to one embodiment of the present disclosure, the state of the page may be saved such that the saved state of the page may be restored at a later stage. For example, the content provided as an input by the user may be saved and the state of the page may be restored using the saved content when the page is visited again by the user. To achieve this, according to one embodiment of the present disclosure, the application may be configured to associate an identification information of a session of the portal and an identification information of the page of the portlet to the saved content. The identification information of the session of the portal and the identification information of the page may be used to restore the state of a page of a portlet. For example, the identification information of the page may assist in uniquely identifying a page and the saved state of the page corresponding to the identification information may be retrieved for restoring the state. The identification information of the session of the portal may assist in determining if it is the same session or a new session. According to one embodiment of the present disclosure, the state of a page may be restored if the session of the portlet being accessed is the same as the session of the state saved. If case the session is a new session, the state of a page saved may be cleared and the state of the new session may be saved. This may assist in clearing the saved state of a page from the memory in aspects of expiry of a session. In aspects of an explicitly logout by a user, application may be configured to clear the saved state of a page from the memory.

According to one embodiment of the present disclosure, the application may be configured to create a namespaced region in the memory for each of the portlet page being monitored. The namespaced region for a page may be associated with the identification information of the session of the portlet and the identification information of the page. On explicit logout of the portal, the namespaced region corresponding to the portal session may be cleared. In aspects of an expiry of a session, the named spaced region may be cleared in a subsequent session. The application may be configured to determine in a subsequent session if any stale namespaced region exists. If any stale namespaced region exists, then the stale namespaced region is cleared and a new namespaced region may be created for the current session.

For example, when an earlier visited page or iframe of a portlet is loaded again without a portal page reload or even with portal page reload, the saved state may be queried from the memory and the contents of the form may be filled in with the previously entered content.

According to an embodiment of the present disclosure, even if the same web page is integrated more than once on the same portal page or on a different portal page, the unique state of each such instance of the web page may be saved separately. For example, this may be achieved by creating different respective namespaced region. As described in the paragraphs above, an identification information of a session of the portal and an identification information of the page of the portlet may be associated with the saved content. The name spaced region may be cleared on explicit logout or on expiry of the portal session.

Figure 3:
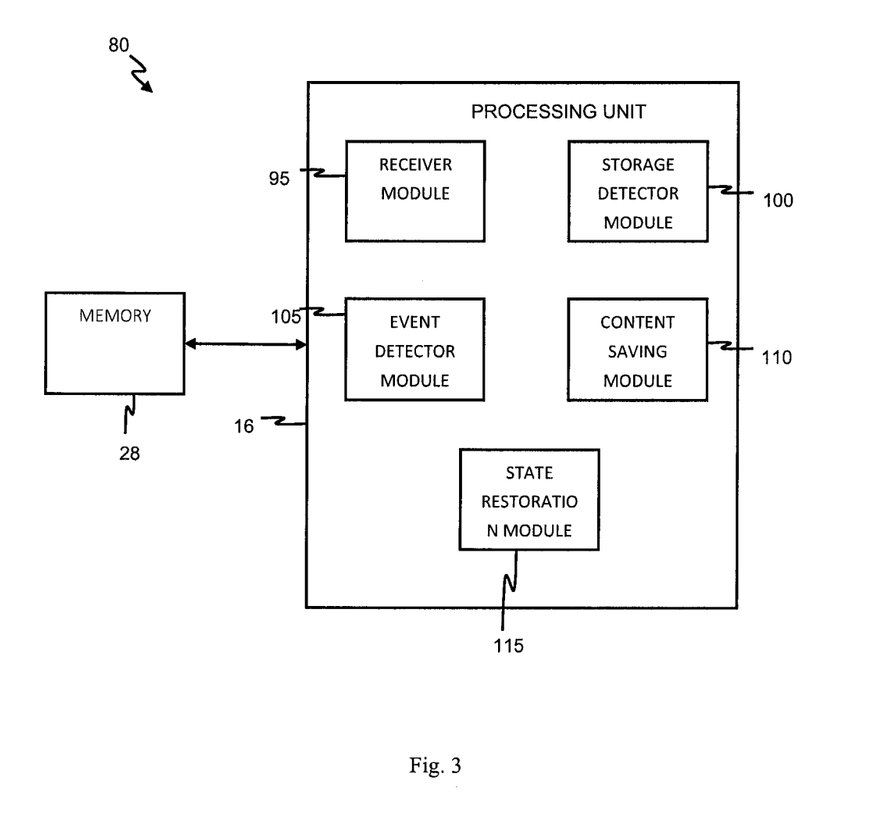
FIG. 3 depicts an example block diagram of a system for saving and restoring a state of a web application according to an embodiment of the present disclosure.

FIG. 3 depicts an example block diagram of a system 80 for saving and restoring a state of a web application according to an embodiment of the present disclosure. The system 80 may include a processing unit 16 operably coupled to a memory 28. The processing unit 16 may include a receiver module 95, a storage detector module 100, an event detector module 105, a content saving module 110 and a state restoration module 115. The receiver module 95 may be configured to receive an indication from at least one portlet of the web application for monitoring state of the portlet. The storage detector module 100 may be configured to detect a type of storage mechanism supported by a client interface used for accessing the web application. The event detector module 105 may be configured to detect an event indicating an input of a content in a form of a page of the portlet. The content saving module 110 may be configured to save the content received as input into the memory 28 using the detected type of storage mechanism. The state restoration module 115 may be configured to restore the state of the page on reload using the content stored into the memory 28.

Figure 4:
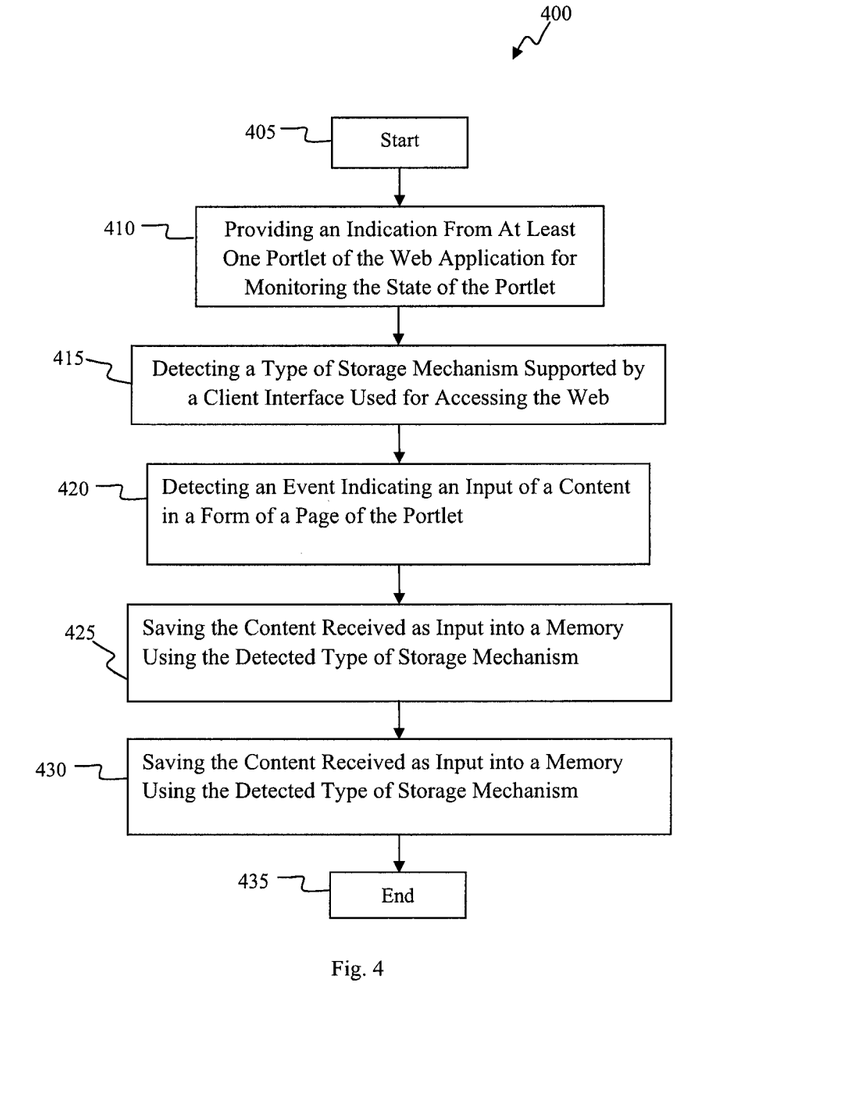
FIG. 4 depicts an example flow for a process in accordance with aspects of the present disclosure.

FIG. 4 depicts an example flow for a process 400 in accordance with aspects of the present disclosure. In embodiments, the process 400 can be performed by the computer system 12 in FIG. 1.

At step 405, the process starts. At step 410, an indication may be provided from at least one portlet of the web application for monitoring the state of the portlet. The indication from the portlet may be provided to the application loaded onto the client device (e.g., the client device 60 in FIG. 1) when the portal is accessed. Next at step 415, a storage mechanism supported by a client interface used for accessing the web application may be detected. At step 420, an event indicating an input of content in a form of a page of the portlet may be detected. The portlets of the portal may be configured to generate an event when content is being provided as input by a user. Next at step 425, the content inputted may be saved into a memory using the detected storage mechanism. At step 430, the state of the page may be restored on reload using the content stored into the memory. The stored content may be queried from the memory for restoring the state. At step 435, the process ends.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The embodiments described herein may enable saving and restoring the state of a web application. The web application may be a portal including one or more portlets. The client state not yet submitted from the client device to the service node may be saved. The saved state may be used for restoring the state of a page of the portlet. Thus, a user can safely navigate across pages of a portlet or pages of a portal and the values entered in the elements of a form may be preserved unless modified in which case the modified values will replace the older set of values. Additionally, for implementing the embodiments, the web application may not be required to be modified in any manner.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
a memory having computer readable instructions; and
a processor for executing the computer readable instruction, the instructions including:
    receiving an indication from at least one portlet of a web application for monitoring the state of the portlet;
    detecting a type of storage mechanism supported by a client interface used when accessing the web application, wherein the type of storage mechanism defines how data received from the web application is stored into memory;
    detecting an event indicating an input of a content in a form of a page of the portlet, wherein the event is detected when navigating from a first text input field to a second text input field;
    saving, on a client device, the content received as input from the first text input field into the memory within the detected type of storage mechanism, wherein saving the content received includes:
        associating the content with a first identification information of a session of the web application,
        associating the content with a second identification information of the page of the portlet,
        creating, within the memory of the client device, a respective namespace region for each unique state of the page of the portlet based upon, at least in part, the first identification information and the second identification information, and
        saving the content within the detected type of storage mechanism in the respective namespace area for each unique state of the page of the portlet based upon, at least in part, the first identification information and the second identification information; and
    restoring the state of the page on reload using the content stored into the memory.

2. The system of claim 1, wherein the instructions further include identifying the content from the memory for restoring the state of the page using the first identification information and the second identification information.

3. The system of claim 1, wherein the instructions further include clearing the content from the memory corresponding to an expiry of a session of the web application.

4. The system of claim 1, wherein the instructions further include clearing the content from the memory corresponding to a termination of the web application.

5. The system of claim 1, wherein the instructions to restore the state of the page on reload using the content stored into the memory further include filling out one or more elements of the form with the content.

6. A computer program product for saving and restoring a state of a web application, the computer program product comprising:
a computer readable storage medium having program code embodied therewith, the program code executable by a processor for:
    receiving an indication from at least one portlet of the web application for monitoring the state of the portlet;
    detecting a type of storage mechanism supported by a client interface used when accessing the web application, wherein the type of storage mechanism defines how data received from the web application is stored into memory;
    detecting an event indicating an input of a content in a form of a page of the portlet, wherein the event is detected when navigating from a first text input field to a second text input field;
    saving, on a client device, the content received as input from the first text input field into a memory within the detected type of storage mechanism, wherein saving the content received includes:
        associating the content with a first identification information of a session of the web application,
        associating the content with a second identification information of the page of the portlet,
        creating, within the memory of the client device, a respective namespace region for each unique state of the page of the portlet based upon, at least in part, the first identification information and the second identification information, and
        saving the content within the detected type of storage mechanism in the respective namespace area for each unique state of the page of the portlet based upon, at least in part, the first identification information and the second identification information; and
    restoring the state of the page on reload using the content stored into the memory.

7. The computer program product of claim 6, wherein the program code is further executable by the processor for identifying the content from the memory for restoring the state of the page using the first identification information and the second identification information.

8. The computer program product of claim 6, wherein the program code is further executable by the processor for clearing the content from the memory corresponding to an expiry of a session of the web application.

9. The computer program product of claim 6, wherein the program code is further executable by the processor for further comprising clearing the content from the memory corresponding to a termination of the web application.

* * * * *